United States Patent
Nakahara et al.

(10) Patent No.: US 11,122,827 B2
(45) Date of Patent: Sep. 21, 2021

(54) NUCLEIC ACID-CONTAINING FERMENTED SEASONING AND METHOD OF PRODUCING THE SAME

(71) Applicant: Kikkoman Corporation, Chiba (JP)

(72) Inventors: Takeharu Nakahara, Chiba (JP); Hiroki Wada, Chiba (JP); Junya Takeichi, Chiba (JP); Kona Yamashita, Chiba (JP)

(73) Assignee: KIKKOMAN CORPORATION, Chiba (JP)

( * ) Notice: Subject to any disclaimer, the term of this patent is extended or adjusted under 35 U.S.C. 154(b) by 281 days.

(21) Appl. No.: 16/305,444

(22) PCT Filed: May 31, 2017

(86) PCT No.: PCT/JP2017/020239
§ 371 (c)(1),
(2) Date: Nov. 29, 2018

(87) PCT Pub. No.: WO2017/209175
PCT Pub. Date: Dec. 7, 2017

(65) Prior Publication Data
US 2020/0221743 A1    Jul. 16, 2020

(30) Foreign Application Priority Data
May 31, 2016   (JP) .............................. JP2016-108141

(51) Int. Cl.
*A23L 27/24* (2016.01)
*A23L 27/40* (2016.01)
(Continued)

(52) U.S. Cl.
CPC ............... *A23L 27/24* (2016.08); *A23L 27/23* (2016.08); *A23L 27/40* (2016.08); *A23L 27/50* (2016.08)

(58) Field of Classification Search
CPC .......... A23L 27/24; A23L 27/40; A23L 27/50; A23L 27/23
(Continued)

(56) References Cited

U.S. PATENT DOCUMENTS

| 2006/0078972 A1 | 4/2006 | Noordam et al. |
| 2008/0241316 A1 | 10/2008 | Hanada et al. |
| 2015/0223504 A1 | 8/2015 | Lee et al. |

FOREIGN PATENT DOCUMENTS

| JP | 60-221055 | 11/1985 |
| JP | 61-37085 | 2/1986 |

(Continued)

OTHER PUBLICATIONS

Luh, B.S., Industrial production of soy sauce, Journal of Industrial Microbiology (1995) (Year: 1995).*

(Continued)

*Primary Examiner* — Brent T O'Hern
(74) *Attorney, Agent, or Firm* — Wenderoth, Lind & Ponack, L.L.P.

(57) ABSTRACT

An object of the present invention is to provide a fermented seasoning containing 5'-nucleotides derived from fermentation at a high concentration without externally adding 5'-nucleotides and a method of producing the same. In a case where the nucleic acids are externally added, display of additives is indispensable on an ingredients description, and thus it cannot be said that the fermented seasoning have no chemical seasoning additive or made by natural brewing; however, with the fermented seasoning relating to the present invention, it is unnecessary to display additives on the ingredients description, and thus it is possible to appeal an added value to nature oriented or natural oriented consumers.

5 Claims, 2 Drawing Sheets

(51) Int. Cl.
*A23L 27/50* (2016.01)
*A23L 27/23* (2016.01)

(58) Field of Classification Search
USPC .......................................................... 426/52
See application file for complete search history.

(56) References Cited

FOREIGN PATENT DOCUMENTS

| | | | |
|---|---|---|---|
| JP | 2006-525794 | 11/2006 | |
| JP | 2009-254336 | 11/2009 | |
| JP | 2016-59382 | 4/2016 | |
| KR | 1998-0078760 | 11/1998 | |
| WO | 2007/043114 | 4/2007 | |
| WO | WO-2007043114 A1 * | 4/2007 | ............. A23L 33/13 |

OTHER PUBLICATIONS

Extended European Search Report dated Apr. 29, 2019 in European Patent Application No. 17806726.0.
International Search Report, dated Sep. 26, 2017 in corresponding International Patent Application No. PCT/JP2017/020239.
Japanese Office Action, dated Sep. 19, 2017 in corresponding Japanese Patent Application No. 2017-107512, with English language translation.
Office Action dated May 31, 2021 in corresponding Korean Patent Application No. 10-2018-7034712, with English Translation.

* cited by examiner

NUCLEIC ACID-CONTAINING FERMENTED SEASONING AND METHOD OF PRODUCING THE SAME

TECHNICAL FIELD

The present invention relates to a fermented seasoning containing nucleic acid(s) produced by microorganism producing nucleic acids with a high concentration in a producing process and a method of producing the same.

BACKGROUND ART

A soy sauce is classified as "special grade", "high grade", and "standard grade" according to "soy sauce quality labeling standard". These grades are determined by the contents of "nitrogen content" which is said to be an index of "umami", chromaticity (shade of color), or the like, and generally, it is said that the soy sauce has the richer umami as the content of nitrogen content is increased. Amino acids including glutamic acid are known as a nitrogen component contributing to the umami of the soy sauce.

Meanwhile, 5'-nucleotides are known as umami components other than amino acids. The 5'-nucleotides are generic names of tasty nucleotides including 5'-adenylic acid, 5'-guanylic acid, 5'-inosinic acid, and 5'-xanthylic acid, and the seasonings containing these may be referred to as nucleic acid-based seasonings. It is known that although 5'-nucleotides alone have a strong taste effect, when L-glutamic acid contained in the soy sauce is present, a taste can be remarkably improved and enhanced by a synergistic effect.

However, since a large amount of phosphatase derived from various microorganisms is present in the soy sauce, even if the tasty nucleotides are added to the soy sauce, the nucleotides are dephosphorylated by action of phosphatase to be hydrolyzed into tasteless nucleosides.

For example, an unheated soy sauce before heating is one of those with particularly strong phosphatase activity, and has been known for that almost all the tasty nucleotides added disappear by 1 day after addition, and the taste of these nucleotides disappears at all (Patent Document 1). In addition, the phosphatase activity exists quite strongly in unheated soy sauce, but has been known for that about 10% to 25% of unheated soy sauce remains in the soy sauce that has been heated (temperature reached at 80° C.).

Therefore, it is necessary to deactivate the phosphatase activity in order to add 5'-nucleotides to the soy sauce and stably retain. A related art method of producing 5'-nucleotide-containing soy sauce is a method of separately adding 5'-nucleotides after deactivating the phosphatase activity of the soy sauce produced by a conventional method (Patent Documents 2 and 3). However, when the nucleic acids are added to the soy sauce, display of additives is indispensable on an ingredients description based on regulations of food labeling related laws, and thus it is required to be displayed as "seasonings (nucleic acid)". It could not be said that such soy sauce-like seasonings have "no chemical seasoning additive" or made by "natural brewing", and thus appeal was weak for natural oriented, naturally oriented consumers.

Examples of known microorganisms for fermentative production of tasty nucleotides include *Candida utilis* used for producing a high nucleic acid type yeast extract and *Corynebacterium glutamicum* used for producing nucleic acid seasonings. Even if it is intended to grow these microorganisms in the soy sauce or moromi with no phosphatase activity and ferment and produce nucleic acids, the microorganisms have no salt tolerance, and thus it is not possible to grow the microorganisms in the soy sauce or the soy sauce moromi, and not possible to contain the high nucleic acid content. From this circumstance, the soy sauce producing industry in the related art, it is considered that 5'-nucleotides are extremely difficult to be produced and accumulated by fermentation in a soy sauce moromi, an unheated soy sauce after pressing, or a soy sauce after heating without adding 5'-nucleotides, and it has not been put to practical use so far.

Although it is not a direct fermentation production in a brewing step of the soy sauce, a method of producing the soy sauce containing nucleic acids as a taste component is described in several documents. For example, Patent Document 4 discloses, in a step of producing moromi of natural brewed soy sauce, a method of producing one obtained by adding water, as brewing water to be added to a koji, to sake cake or the like and then being self-digested at 50° C. to 60° C. for 1 or 2 weeks, or a rich soy sauce characterized by using a highly tasty liquid obtained by pressing the aforementioned one. However, it is necessary to use special ingredients (that is, sake lees and distilled spirit distillation waste). Therefore, as compared with an ordinary brewed soy sauce, it has a disadvantage that the taste also is considerably far apart.

RELATED ART

Patent Document

Patent Document 1: JP-B-S53-33661
Patent Document 2: JP-B-S39-27496
Patent Document 3: Japanese Patent No. 4781365
Patent Document 4: JP-A-S54-84097

DISCLOSURE OF INVENTION

Problems to be Solved by the Invention

An object of the present invention is to provide a fermented seasoning containing 5'-nucleotides derived from fermentation at a high concentration without externally adding 5'-nucleotides and a method of producing the same.

Means for Solving the Problems

As a result of intensive studies to solve the above problems, the inventors have found that a fermented seasoning containing nucleic acid(s) at a high concentration derived from fermentation without separately adding the nucleic acids can be obtained by the following procedure. When nucleic acid fermentation is performed while preventing contamination with a container that is capable of preventing the contamination of harmful microorganisms after a salt-free or low salt brewing water is added to a solid koji prepared by inoculating koji mold to a cereal raw material mainly containing soybean or wheat or the like to prepare moromi, and the moromi is thermally pasteurized (phosphatase deactivation), nucleic acid fermentation due to nucleic acid fermentation production microorganisms not having salt tolerance becomes possible.

According to an aspect of the present invention, there is provided a fermented seasoning containing 10 ppm (w/v) or more of nucleic acid(s) (provided that nucleic acids derived from addition are excluded); and 2 ppm (w/v) or more of 4-hydroxy-2,5-dimethyl-3(2H)-furanone (HDMF).

According to another aspect of the present invention, there is provided a method of producing a fermented seasoning, the method including a step of preparing a solid koji by inoculating a koji mold to a cereal raw material containing soybean or wheat as a main raw material and adding water or a saline solution to thermally hydrolyze moromi with a salt concentration of 4% (w/v) or less, a step of preparing pasteurized moromi by deactivating phosphatase by a heat treatment of the moromi, a step of performing nucleic acid fermentation in a container that is capable of preventing the contamination of harmful microorganisms by inoculating the pasteurized moromi with a microorganism producing nucleic acids, a step of preparing an RNA extract by self-digesting the microorganism producing nucleic acids and liberating the RNA in bacteria into the moromi, and a step of allowing ribonuclease to act on the RNA extract ribonuclease and adenylate deaminase so as to be converted into tasty 5'-nucleotides.

Effects of the Invention

According to the present invention, it is possible to provide a fermented seasoning containing nucleic acid at a high concentration only with 5'-nucleotides produced by microorganism producing nucleic acids during fermentation without externally adding 5'-nucleotides (nucleic acid) and a method of producing the same.

EMBODIMENTS FOR CARRYING OUT THE INVENTION

Figure 1:
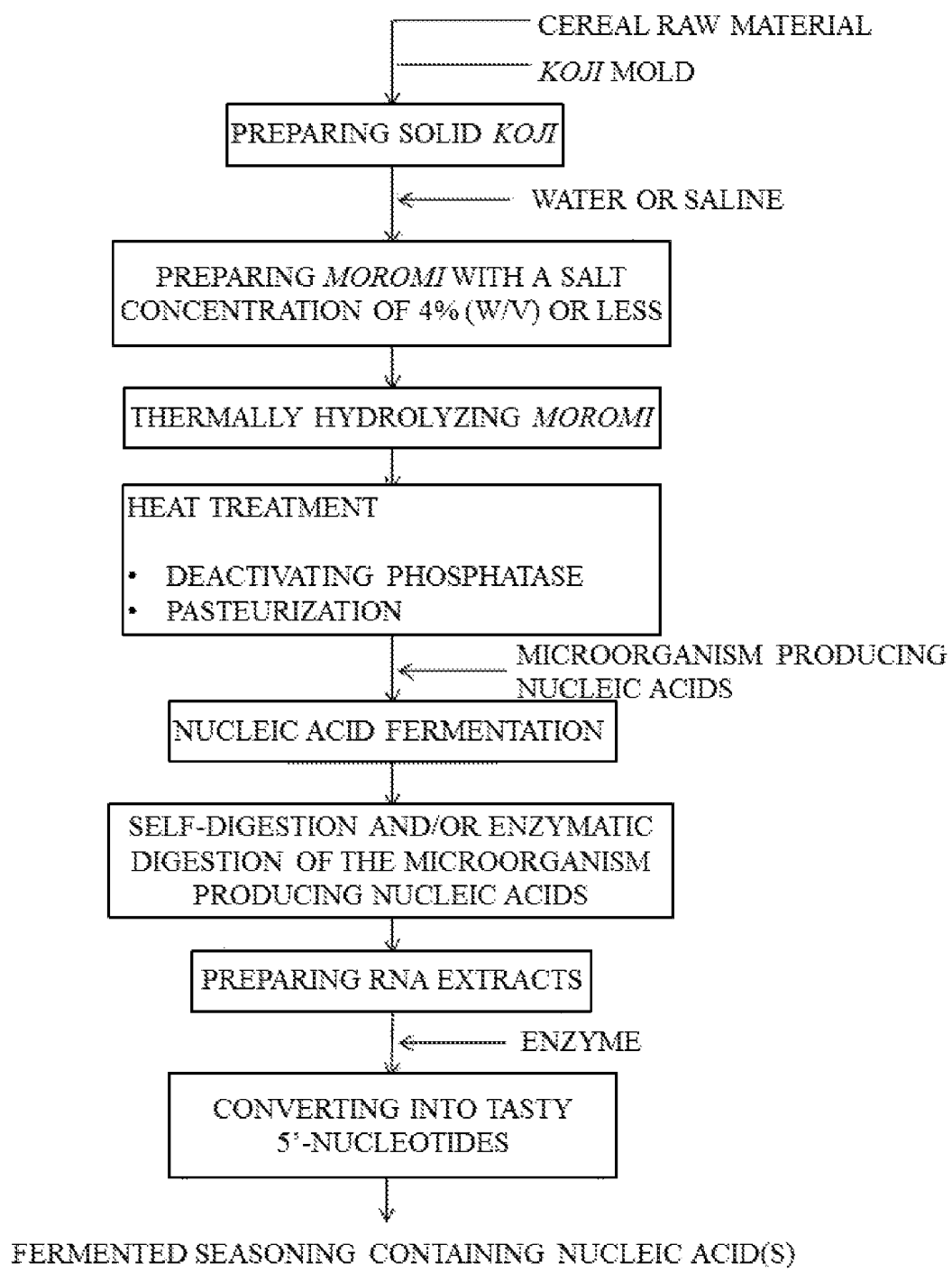
FIG. 1 is a process chart of a method for producing nucleic acid-containing a fermented seasoning according to this embodiment.
Figure 2:
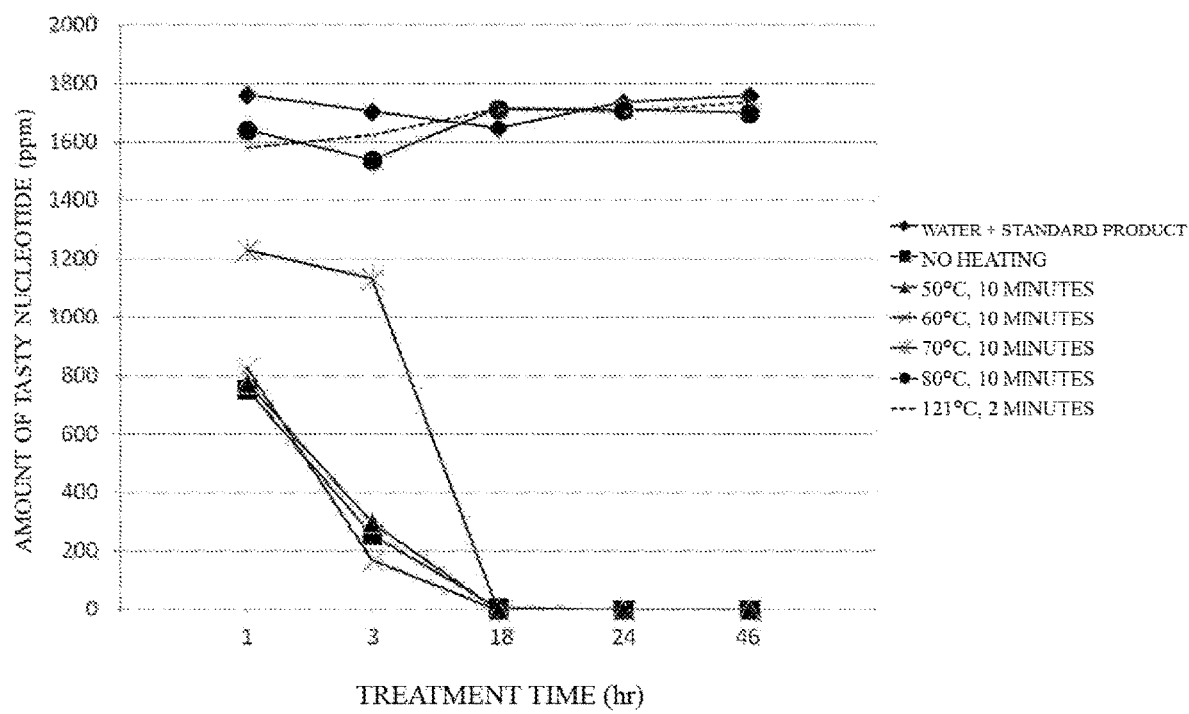
FIG. 2 is a diagram illustrating a result of quantitating nucleic acid concentration over time by adding tasty nucleic acids (5'-guanylic acid and 5'-inosinic acid) after heating a salt-free moromi.

Hereinafter, a fermented seasoning and a production method thereof according to the present invention will be described in detail. FIG. 1 is a process chart of a method for producing nucleic acid-containing fermented seasoning according to this embodiment.

In the present invention, the nucleic acid(s) means tasty nucleotides such as 5'-adenylic acid, 5'-guanylic acid, 5'-inosinic acid, and 5'-xanthylic acid.

In the embodiment of the present invention, first, water or saline is mixed with solid koji prepared from a cereal raw material, and a soy sauce moromi having a salt concentration of 4% (w/v) or less, preferably having the salt concentration of less than 4% (w/v), and more preferably having the salt concentration of 0% (w/v) is prepared, and is thermally hydrolyzed at 25° C. to 57° C. for 0 to 48 hours. Preferably, as disclosed in Japanese Patent No. 3827300, it is desirable hot water or saline at 70° C. to 80° C. is mixed with the solid koji and is stirred intermittently or continuously in a tank, and digest enzymatically for 15 to 30 hours, while maintaining moromi temperature at 50° C. to 57° C.

Here, the cereal raw material is a protein raw material represented by, for example, whole soybean, defatted soybean, soybean protein, wheat gluten, peas, bean, red bean, and the like, and a starchy raw material represented by wheat, barley, rye, bran, rice, rice bran, corn, starch meal, and the like. These can be used alone or in combination.

The koji (solid koji) used here is obtained by inoculating a koji mold represented by *Aspergillus sojae*, and *Aspergillus oryzae* on a protein raw material which is raw material-treated by a conventional method or a mixture of a starchy raw material and the raw material, and then solid culturing (koji making) the resultant for 2 to 3 days. In a case where the starchy raw material is mixed with the protein raw material, a blend ratio is not particularly limited, but for example, in order to obtain seasoning close to regular soy sauce, a weight ratio is preferably set to be 1:0.25 to 4.

The water or saline used for brewing may be sufficient if the koji is sufficiently soaked, and generally, it is preferably set to be 1 to 10 volumes (v/w) with respect to the weight of the koji. Further, at the time of thermal hydrolysis, edible acid, an enzyme agent, or activated carbon described below may be added for improving the antibacterial property and the hydrolysis efficiency and improving the taste.

At the time of thermal hydrolysis, the enzyme agent may be added to a final concentration of 0.001 to 1% (w/v) in order to promote hydrolysis of moromi. As the enzyme agent, for example, protease (endoprotease and exoprotease), cellulase, and pectinase can be exemplified.

Next, a heat treatment is performed on the soy sauce moromi before solid-liquid separation, which has a salt concentration of 4% (w/v) or less and subjected to thermal hydrolysis so as to prepare pasteurized moromi. Through this heat treatment, the nucleic acid hydrolyzing enzyme such as phosphatase produced by the koji mold in the above-mentioned koji making step is deactivated, and at the same time, the moromi is pasteurized. Here, for the purpose of reducing the burden on a pasteurizer and improving the growth rate of microorganism producing nucleic acids, the moromi may be diluted by appropriately adding water before pasteurization.

Here, the method of heat treatment is not particularly limited, for example, any of heat treatment methods using UHT, HTST, retort, pressurized tank, steam injection, steam infusion, autoclave, plate heater, surface scraping type heat exchange, Joule type heat exchange, and tubular type heat exchanger may be used, but preferably a method of using the pressure tank or the tubular heat exchanger is used. For example, it is possible to deactivate a nucleic acid hydrolyzing enzyme or pasteurize by placing the moromi in a pressurized tank and pressurizing and heating while uniformly stirring. When a heating temperature is excessively low or a heating time is excessively short, it is not preferable because the deactivation of the nucleic acid hydrolyzing enzyme and the pasteurization of bacterial are insufficient. Conversely, when the heating temperature is excessively high or the heating time is excessively long, it is not preferable because the taste of the seasoning is deteriorated. Although optimum conditions vary depending on the heating method to be selected, for example, it is preferably 2 minutes or longer and 180 minutes or shorter at 80° C., 5 seconds or longer and 15 minutes or shorter at 121° C., and 1 second or longer and 30 seconds or shorter at 130° C.

For the prepared moromi, pH adjustment may be carried out in order to improve the antimallotic property and to adjust the taste. The pH after adjustment is desirably set to 3.0 to 7.0, and is preferably 4.0 to 5.5 from the viewpoint of antimallotic property and yeast fermentability. The timing of pH adjustment may be either during thermal hydrolysis, before heat treatment of moromi, or after heat treatment of moromi. Examples of edible acids as pH adjusters include lactic acid, acetic acid, malic acid, citric acid, gluconic acid, and adipic acid, and from the viewpoint of taste, lactic acid is preferable.

In order to facilitate nucleic acid fermentation by microorganism producing nucleic acids, sugar may be added to moromi at 0% to 20% (w/v). For example, sugar that can be assimilated by microorganism producing nucleic acids such as glucose, fructose, sucrose, maltose, mannose, and glycerol can be used, but glucose is preferably used in consideration of utilization efficiency. Further, food materials containing these sugars, for example, table sugar, a high fructose corn syrup (liquid sugar which includes less than 50% of fructose), a high fructose corn syrup (liquid sugar which includes 50% or more and less than 90% of fructose), soft brown sugar and molasses may be used.

Also, prior to the nucleic acid fermentation, the enzyme agent may be added to a final concentration of 0.001 to 1% (w/v) in order to promote hydrolysis of moromi and improve pressability. As the enzyme agent, for example, protease (endoprotease and exoprotease), cellulase, and pectinase can be exemplified.

Also, prior to the nucleic acid fermentation, activated carbon may be added to moromi to remove bitterness and improve the taste. The activated carbon is preferably a powder, and is more preferably an activated carbon having an average particle diameter of 10 to 100 μm. The added amount of the activated carbon is preferably 0.1% to 5% (w/w) based on the raw material of moromi. The kinds of the activated carbon can be appropriately selected depending on the application, and for example, an activated carbon having a function of removal of bitterness, an activated carbon having a function of removal of malodor, an activated carbon having a function of adjustment of taste, an activated carbon having a function of adjustment of color, and an activated carbon having these functions can be used in combination.

In addition, prior to the nucleic acid fermentation, the pasteurized moromi may be subjected to solid-liquid separation. The method of solid-liquid separation is not particularly limited, and it can be carried out by a method such as pressing, centrifugation, or filtration.

The microorganism producing nucleic acids used in the present invention are not particularly limited as long as it is a microorganism capable of producing nucleic acids, and examples thereof include yeast such as *Candida utilis, Saccharomyces cerevisiae, Zygosaccharomyces rouxii, Schizosaccharomyces pombe*, and *Kluyveromyces marxianus*, bacteria such as *Corynebacterium glutamicum, Corynebacterium ammoniagenes*, and *Bacillus subtilis*, and nutritional requirement and analog resistant variants thereof. Since the moromi of the present invention is salt-free or low salt, it is possible to use yeast and bacteria which are originally weak in salt resistance.

The addition concentration of these microorganism producing nucleic acids is preferably $1 \times 10^4$ or more, preferably $1 \times 10^5$ to $1 \times 10^7$ per 1 g of the moromi in the yeast, and if it is a bacterium, the addition concentration thereof is preferably $1 \times 10^4$ or more, and is more preferably $1 \times 10^5$ to $1 \times 10^7$ per 1 g of the moromi.

The moromi is put into a container that is capable of reducing the contamination of harmful microorganisms, and the nucleic acid fermentation is carried out in this container. Here, the container capable of reducing the contamination of the harmful microorganisms may be any container as long as it has a structure capable of intercepting the interior of the container and outside air, and a polypropylene wide-mouthed bottle which is pasteurized for removal bacteria, a media bottle made of glass, or the like can be experimentally used, and a jar fermenter having a function of supplying air processed for removal of bacteria in a container or a pressurized fermentation tank can be industrially used. For removing of bacteria in air, a filter capable of collecting 99.97% or more of dust of 0.3 μm or more, such as a HEPA filter, can be used.

The nucleic acid fermentation is carried out at a temperature at which microorganism producing nucleic acids can grow, and specifically, the temperature is 15° C. to 45° C., and is preferably 20° C. to 35° C. for 1 to 90 days or preferably 2 to 28 days.

The production amount of alcohol contained in the fermented seasoning according to this embodiment can be adjusted to be 0% to 20% (w/v) depending on the concentration of sugar added in the nucleic acid fermentation step, the kinds of microorganism to be used, and temperature conditions, and the alcohol may be added at the end of nucleic acid fermentation. In this case the amount thereof is preferably less than 8% (w/v), and is more preferably 2% to 7% (w/v) in order to impart a good taste as fermented seasoning.

After completion of the nucleic acid fermentation, the microorganism producing nucleic acids in the moromi are self-digested, or a yeast cell wall is dissolved using an enzyme agent containing protease or β-glucanase to liberate RNA in the bacteria into the moromi. The self-digestion can be done by heating the moromi for a certain period of time. More preferably, the self-digestion is carried out under the conditions in which elution of RNA of the microorganism producing nucleic acids is sufficient to maximize, for example, the self-digestion is more preferably carried out at a product temperature of 40° C. to 60° C. for 1 minute to 24 hours. When the product temperature is lower than 40° C., it takes time to self-digest and the RNA derived from the microorganism producing nucleic acids to the moromi soup is not sufficiently eluted; whereas when the product temperature exceeds 60° C., deterioration of browning and taste due to heat deterioration of the moromi is caused, which is not preferable. When the time is shorter than 1 minute, the RNA derived from the microorganism producing nucleic acids is not sufficiently eluted, whereas when the time exceeds 24 hours, deterioration of browning and taste of the moromi due to heat deterioration, which is not preferable. In addition, for the purpose of improving nucleic acids liberating efficiency during the self-digestion, a method of heat deactivating an nucleic acid hydrolyzing enzyme before digestion, a method of freezing and thawing, a method of adding an organic solvent such as ethanol, a method of performing an ultrasonic treatment, a method of adjusting acidity to be pH 4 to pH 6 or alkalinity to be pH 8 to pH 12, and the like can be used in combination. In addition, as the enzyme agent for dissolving the yeast cell wall, TUNICASE (trademark, manufactured by Amano Enzyme Inc.), DENAZYME GEL (trademark, manufactured by NAGASE CHEMTEX Corporation), FILTRASE BRX (trademark, manufactured by DSM) can be used in accordance with a conventional method.

After the self-digestion or enzymatic digestion of the microorganism producing nucleic acids, a non-tasty RNA extract is enzymatically treated to be converted into tasty 5'-nucleotides (nucleic acids). A nuclease can be used as the enzyme, and in addition to this, it is preferable to use a deaminase. Examples of the nuclease include ribonuclease, and deoxyribonuclease, and it is preferably ribonuclease. Furthermore, among the ribonucleases, P1 nuclease, S1 nuclease, and the like can be exemplified depending on a cleavage mode, and any enzyme can be used. Also, the deaminase is preferably adenylate deaminase. For each of these enzymes, commercially available various enzymes can be used. Foods containing these enzymes such as malt or germinated rice can be added. A temperature, a pH, an addition amount, a treatment time, and the like in the enzyme treatment can be appropriately determined in consideration of the kinds of enzyme to be used, the strength of activity, the desired nucleic acid concentration, and the like. In addition, the enzyme treatment may be carried out as long as a deaminase treatment can be carried out on a nuclease-treated product, and the deaminase treatment may be performed by adding deaminase to the RNA extract after nuclease treatment, and in a case where the nuclease and deaminase both exhibit enzymatic activity at the same temperature, the enzyme treatment may be carried out at the same time by adding both of the nuclease and the deaminase to the RNA extract.

For example, the RNA extracts from which an insoluble matter has been removed are adjusted to have pH 4.0 or more, less than pH 7, and preferably pH 4.5 to pH 6.0, and then the nuclease treatment is carried out at 60° C. to 80° C. for 30 minutes to 12 hours by adding the nuclease, and the deaminase treatment is carried out at 40° C. to 60° C. for 30 minutes to 6 hours by adding deaminase, and thereby inosinic acid and guanylic acid can be sufficiently produced.

If the moromi that the enzyme treatment step has been completed is moromi (misopaste) like seasoning without pressing as it is, the moromi-like seasoning containing nucleic acid(s) derived from fermentation at a high concentration can be obtained. In addition, a fermented seasoning (for example, soy sauce-like seasoning) containing nucleic acid(s) derived from fermentation at a high concentration can be obtained by subjecting the moromi to a treatment by the ordinary method such as pressing, heating, clearing, and filtration.

After completion of the enzyme treatment step, salt-containing fermented seasoning can be prepared by adding a salt to the moromi. That is, the nucleic acid fermentation of the moromi is carried out under salt-free or low salt conditions so as to promote the nucleic acid fermentation, and sodium chloride having a certain concentration is added to the thus obtained fermented moromi, and thereby fermented seasoning having a soy sauce-like taste can be produced. The amount of salt to be added can be appropriately set, and reduced salt soy sauce-like seasoning and koikuchi (dark-colored) soy sauce-like seasoning can be easily prepared depending on the salt concentration.

In the fermented seasoning of this embodiment, the nucleic acid concentration excluding the nucleic acids derived from the addition is 10 ppm or more. The nucleic acid concentration can be appropriately adjusted depending on the concentration of sugar added, the kinds of microorganism to be used, and the temperature conditions in the nucleic acid fermentation step, but since the nucleic acid concentration depends on the nucleic acid producing ability of the microorganism producing nucleic acids, an upper limit value is naturally determined depending on the kinds of the microorganism producing nucleic acids. For example, in a case where the nucleic acid fermentation is carried out with the above-described nucleic acid producing yeast, the upper limit is about 5000 ppm. Incidentally, it is also possible to increase the concentration of nucleic acid(s) in the fermented seasoning to the above-mentioned upper limit value or more by carrying out concentration processing by publicly known methods such as heating under reduced pressure concentration, spray drying, freeze drying, and the like after the nucleic acid fermentation.

While the nucleic acid content of regular koikuchi (dark-colored) soy sauce is below a detection limit, the fermented seasoning of this embodiment contain a significant amount of nucleic acid(s) as described above. Therefore, due to a synergistic effect with glutamic acid (about 0.2% to 2.0% (w/v)) originally contained in the soy sauce, the fermented seasoning according to this embodiment and the umami-koku attribute (richness) of food and drink using the fermented seasoning are remarkably improved. In a case where the nucleic acids are externally added, display of additives is indispensable on a ingredients description, and thus it cannot be said that the fermented seasoning have no chemical seasoning additive or made by natural brewing; however, with the fermented seasoning of this embodiment, it is unnecessary to display additives on the raw material name, and thus it is possible to appeal an added value to nature oriented or natural oriented consumers.

The fermented seasoning according to this embodiment have 4-hydroxy-2,5-dimethyl-3(2H)-furanone (also referred to as hydroxy dimethylfuranone, and HDMF) which is one of aroma components and has a concentration of 2 ppm (w/v) or more, and thus have a more preferable taste. The HDMF is a representative furanone compound, which has both sugar-like sweetness and fruity and is known as a representative aroma component of the seasoning such as a soy sauce that contributes to taste enhancement. The fermented seasoning of the present invention is characterized to contain the HDMF equivalent to or higher than that of regular koikuchi (dark-colored) soy sauce, and to be excellent in a fragrant taste like soy sauce. When the HDMF concentration is lower than 2 ppm, the fragrant taste like soy sauce becomes insufficient. The HDMF contained in the fermented seasoning according to this embodiment is produced through fermentation from koji as a raw material, and as with the above-described nucleic acids, the display of the additives is unnecessary on the ingredients description, and thus it is possible to appeal an added value to nature oriented or natural oriented consumers.

As another embodiment of this embodiment, an unheated soy sauce or a heated soy sauce prepared by an ordinary method is desalted by electrodialysis or the like to lower the salt concentration, and thereby desalted unheated soy sauce or desalted heated soy sauce having the salt concentration of 4% (w/v) or less may be prepared, and thereafter, thermal pasteurization (phosphatase deactivation), aseptic nucleic acid fermentation, and conversion into tasty nucleic acids may be carried out as described above.

That is, the desalted unheated soy sauce or the desalted heated soy sauce having a salt concentration of 4% (w/v) or less is prepared by desalting the unheated soy sauce or the heated soy sauce prepared using an ordinary method by lowering the salt concentration through the electrodialysis or the like. Next, the desalted unheated soy sauce or the desalted heated soy sauce is heated with a jacketed tank or heat-treated with a heat exchanger such as a plate heater or a tube heater, so that phosphatase in the desalted unheated soy sauce or the desalted heated soy sauce is deactivated and the desalted unheated soy sauce or the desalted heated soy sauce is pasteurized for removal of bacterial. In addition, the nucleic acid fermentation is performed under the above-described fermentation conditions in which the desalted unheated soy sauce or the desalted heated soy sauce which has been pasteurized for removal of bacterial is aseptically transferred to a container that is capable of preventing contamination of harmful microorganisms, and the microorganism producing nucleic acids are inoculated. After that, when the self-digestion is performed on the microorganism producing nucleic acids so as to prepare the RNA extract by liberating the RNA in the bacteria into the moromi, and a nuclease such as ribonuclease and a deaminase such as adenylate deaminase are allowed to act on the RNA extract, the RNA extract can be converted into tasty 5'-nucleotides and a desired fermented seasoning liquid can be produced.

The fermented seasoning of the present invention can be used as it is in the same manner as natural seasoning and a soy sauce defined in the Japanese Agriculture Standards, and it can also be blended in any food and drink. Therefore, it is possible to provide food and drink containing the fermented seasoning of the present invention with improved umami and koku attribute (richness). Specific examples of the food and drink include seasoning raw materials such as a soy sauce processed product, soups, sources, ponzu, Japanese stock, Western stock, Chinese stock, dressings, and seasoning of side dishes; an agricultural processed food product including a processed product such as vegetables, fruits, and grains; a fishery processed food product including a processed product such as seafoods and seaweeds; and a livestock processed food product including a processed product such as eggs and dairy product. In the food and drink containing the fermented seasoning of the present invention, the nucleic acid content of the final product is increased, and thus it is possible to improve the umami and enhance the taste. In addition, it is possible to display as the fermented seasoning in the ingredients description of the final product, which has the advantage that the display of the additives of nucleic acids becomes unnecessary.

Hereinafter, the present invention will be described more specifically with reference to examples. However, the technical scope of the present invention is not limited to these examples at all.

EXAMPLES

Example 1

Preparation of High Nucleic Acid Fermented Seasoning
1. Preparation of Soy Sauce Koji A soy sauce koji was prepared in accordance with a conventional method at a blending ratio of 50% (w/w) of defatted processed soybean and 50% (w/w) of roasted cracked wheat. Note that, the defatted processed soybean which was sprayed with water of 130% (w/w) and boiled. This raw material was inoculated with seed starter of *Aspergillus sojae* and it was made for 42 hours in an environment of 25° C. to 40° C. with humidity of 95% so as to obtain a soy sauce koji.

2. Preparation of Moromi 200 parts by weight of hot water heated to 70° C. (not containing sodium chloride) was mixed with 100 parts by weight of the soy sauce koji and the mixture was continuously stirred at 100 rpm in a hydrolysis tank with a heat insulating jacket having a stirring blade disposed on a rotating shaft and was subjected to thermal hydrolysis at 55° C. for 24 hours so as to obtain salt-free moromi.

3. Pasteurization of Moromi and Phosphatase Deactivation Treatment 600 g of the above salt-free moromi was put into a 2.5 L of jar fermenter (manufactured by Biott), 12 g of potassium dihydrogenphosphate (prepared by Wako Pure Chemical Industries, Ltd.), 0.6 mL of a defoaming agent (prepared by Shin-Etsu Silicone Co., Ltd.), and 360 mL of tap water were added thereto, potassium hydroxide (prepared by Wako Pure Chemical Industries, Ltd.) was added to adjust the pH to be 5.5, and a mixture was pasteurized at 121° C. for 5 minutes in an autoclave.

4. Nucleic Acid Fermentation

The above salt-free moromi was cooled to 30° C., *Candida utilis* was inoculated as a yeast producing nucleic acids, and cultured at 30° C. for 48 hours in accordance with a conventional method. 50% glucose aqueous solution which was separately pasteurized for removal of bacteria was fed at 1.7 g/hr, and aseptic air was blown at 1 L/min and internal pressure of 0.04 MPa. The stirring speed was 600 rpm.

5. Enzyme Treatment

After completion of the culture, 300 mg of TUNICASE (trademark, prepared by Amano Enzyme Inc.) was added, and the mixture was stirred at 50° C. for 2 hours. Subsequently, 300 mg of NUCLEASE AMANO G (trademark, prepared by Amano Enzyme Inc.) was added, and the mixture was stirred at 45° C. for 1 hour. Further, 300 mg of DEAMIZYME (trademark, prepared by Amano Enzyme Inc.) was added, and the mixture was stirred at 45° C. for 1 hour. Finally, the enzyme was deactivated by stirring at 80° C. for 20 minutes, and filtration was carried out with a filter paper (manufactured by Advantech Co., Ltd.) in accordance with a conventional method so as to obtain a fermented (soy sauce-like) seasoning liquid containing high nucleic acids (Sample 1).

6. Component Analysis of Fermented Seasoning (1) Quantification of Tasty Nucleic Acids The quantification of the tasty nucleic acids was carried out by high performance liquid chromatography (HPLC) by a method modified in advance (Tokyo Metropolitan Institute of Medical Research Annual Report, p. 172-175, 2001). That is, using a solid phase extraction column Sep-Pak Light QMA (manufactured by Waters Corporation), and a pretreatment was carried out in the following manner.

↓ 2 mL of Methanol (activated)
↓ 4 mL of Ultrapure water (equilibrated)
↓ Sample 300 μL
(Mix with 50 μL of ammonia and load 350 μL)
↓ 3 mL of Ultrapure water (non adsorbed fraction)
↓ 5 mL of 1% formic acid (adsorbed fraction)
↓ Evaporate and solidify with a centrifugal concentrator
↓ Redissolve in eluent A of HPLC Next, this pretreated sample was analyzed by HPLC (manufactured by Shimadzu Corporation). Conditions are as follows.

Column: Shiseido CAPCELL PAK C18 MGIII 4.6×250 mm (manufactured by Shiseido Company, Limited)

Eluent A: 0.1% triethylamine+1% methanol/ultrapure water, pH 5.0 (adjusted with phosphoric acid)

Eluent B: 80% acetonitrile/ultrapure water

Flow rate: 1.0 mL/min,

Detection: UV 254 nm

The quantitation was carried out from calibration curves of 5'-IMP and 5'-GMP used as standard products. As a result, the nucleic acid concentration was as indicated in Table 1. Here, the concentration (w/v) per volume of the fermented seasoning liquid is obtained from "5. Enzyme treatment".

(2) Quantitation of HDMF

The concentration of the HDMF is carried out a quantitative analysis method described in J. Agric. Food Chem. Vol. 39, 934. 1991. More specifically, the analysis was carried out by gas chromatography (6890N manufactured by Agilent Technologies, Inc.), and the contents of various aroma components were determined by a calibration curve method using standard substances.

TABLE 1

| Measurement Items | Concentration (ppm) | |
|---|---|---|
| | Example 1 | Commercially available koikuchi (dark-colored) soy sauce *[1] |
| 5'-IMP | 1847 | Detection limit or lower *[2] |
| 5'-GMP | 1853 | Detection limit or lower *[2] |
| HDMF | 7 | 2 |

*[1] "Kikkoman soy source" produced by Kikkoman Corporation
*[2] Detection limit: 1 ppm Example 2

Effect of Adding Nucleic Acids to Soy Sauce-Like Seasoning Liquid

A salt was added to the salt-free soy sauce-like seasoning prepared by the method described in Example 2-1 of Japanese Patent No. 5836466 so that the salt concentration became less than 4% (w/v), further seasoning containing 5'-IMP and 5'-GMP as main components (trade name: RIBOTADE, prepared by MC Food Specialties Incorporated, 5'-IMP:5'-GMP content ratio=1:1) were added at each concentration, and thereby, a desired soy sauce-like seasoning liquid was prepared (Samples 2 to 7). For each of these samples, organoleptic evaluation was carried out in the following manner. In addition, it was confirmed by analysis that the amount of nucleic acids originally contained in the control reduced salt soy sauce was the detection limit or less. For the organoleptic evaluation, seven panelists with discriminating ability can evaluate whether there is a difference in taste from the control soy sauce-like seasoning liquid without nucleic acid added by putting a stock solution of the sample directly in the mouth with a dropper, and the result was indicated by the number of people who were able to identify the difference was shown.

Further, through discussion of all panelists, the comprehensiveness of the taste was indicated by A, B, and C (Table 2). The A, B, and C indicate the following evaluations.
A: Very preferable compared to control
B: Preferable compared with control
C: Equivalent to control

TABLE 2

| Concentration of Nucleic acids (ppm) | Number of people who was able to identify difference (Number) | Comprehensive Evaluation |
|---|---|---|
| 1 | 0 | C |
| 10 | 7 | B |
| 100 | 7 | A |
| 1000 | 7 | A |
| 5000 | 7 | B |
| 10000 | 7 | C |

From Table 2, there was a comment from the panelists that in the samples with nucleic acid concentrations of 10 ppm or more (Samples 3 to 7), all panelists discriminated the difference in taste, and especially when the concentration was 100 ppm or more, the sustainability of umami and taste improved. From this result, it was indicated that the taste of soy sauce-like seasoning can be improved by including nucleic acids of 10 ppm or more in the soy sauce-like seasoning obtained by a production method similar to the present invention. Here, there was a comment from the panelists that at a nucleic acid concentration of 10000 ppm, the taste of the nucleic acids were excessively strong and the balance of the taste as the soy sauce-like seasoning collapsed, and thus the overall evaluation was comparable to the control.

Example 3

Effect of Adding Nucleic Acid-Containing Fermented Seasoning to Soy Sauce

The nucleic acid-containing soy sauce-like seasoning (Sample 1) prepared in Example 1 of the present invention was added to the reduced salt soy sauce (commercially available product from Kikkoman Corporation) by changing the blending amount so as to prepare soy sauce-like seasoning liquid having the nucleic acid concentration of 1 to 1000 ppm was prepared. For each of these samples, a salt was added such that a salt concentration becomes 9% (w/v) in the following manner so as to prepare desired soy sauce-like seasoning (Samples 8 to 12). For each of these samples, organoleptic evaluation was carried out in the same manner as that in Example 2.

TABLE 3

| Concentration of Nucleic acids (ppm) | HDMF(ppm) | Number of people who was able to identify difference (Number) | Comprehensive Evaluation |
|---|---|---|---|
| 1 | 2 | 1 | C |
| 10 | 2 | 7 | B |
| 50 | 2 | 7 | A |
| 100 | 2 | 7 | A |
| 1000 | 3 | 7 | B |

From Table 3, it was confirmed that when the nucleic acid-containing fermented seasoning of the present invention is added so that the nucleic acid concentration becomes 10 ppm or more, the taste of the reduced salt soy sauce is remarkably improved. At a nucleic acid concentration of 1000 ppm, since the blending amount of nucleic acid-containing fermented seasoning was relatively large, the taste slightly different from the control reduced salt soy sauce was felt, but the quality was improved as a whole. Further, in the present invention, it was confirmed that a considerable amount of the HDMF was contained, it has a fragrant scent like soy sauce and has excellent quality as the fermented seasoning.

Example 4

Deactivation Conditions of Enzyme Hydrolyzing Nucleic Acids 6 mL of tap water was added to 4 g of salt-free moromi of Example 1, and the mixture was heated at 50° C., 60° C., 70° C., and 80° C. for 10 minutes, or heated at 121° C. for 2 minutes. Subsequently, 900 ppm of 5'-guanylic acid and 900 ppm of 5'-inosinic acid were added to each moromi at 30° C. and were shaken for 46 hours. Thereafter, the solid content was removed by centrifugation, and a supernatant liquid was passed through a 0.45 μm filter (manufactured by Advantech Co., Ltd.).

The quantitation of the tasty nucleic acids was performed using a high performance liquid chromatograph mass spectrometer (LC-MS). The conditions are as follows.
Column: Poroshell 120 PFP 3.0×150 mm (manufactured by Agilent Technologies)
Eluent A: 0.1% formic acid/ultrapure water
Eluent B: 0.1% formic acid/acetonitril Flow rate: 0.4 mL/min
Ionization: ESI (+)
Detection: SIM mode The quantitation was performed using standard products of 5'-IMP and 5'-GMP according to the standard addition method. The results are shown in FIG. 1. FIG. 1 is a diagram illustrating a result of quantitating nucleic acid concentration over time by adding tasty nucleic acids (5'-guanylic acid and 5'-inosinic acid) after heating a salt-free moromi.

As illustrated in FIG. 1, in a case where the heating temperature was 70° C. or lower, the tasty nucleic acids were completely hydrolyzed when treated for 18 hours; whereas in a case where the heating temperature was 80° C. or higher, tasty nucleic acids were not hydrolyzed observed for 46 hours from the start of the treatment. Therefore, it was found that the pasteurization at 80° C. for 10 minutes is necessary to deactivate the nucleic acid hydrolyzing enzyme.

Example 5

Nucleic Acid Fermentation by Various Yeasts 1 g of potassium dihydrogen phosphate, 0.1 g of an antifoaming agent, and 60 mL of tap water were added to 40 g of the salt-free moromi of Example 1, and the mixture was adjusted to pH 5.5 with potassium hydroxide, and pasteurized at 121° C. in an autoclave for 2 minutes.

5 mL of 50% glucose solution which was separately pasteurized for removal of bacteria was added to the above medium, and *Candida utilis* (Sample 13), *Saccharomyces cerevisiae* (Sample 14), *Zygosaccharomyces rouxii* (Sample 15), or *Kluyveromyces marxianus* (Sample 16) was cultured at 30° C. for 24 hours in accordance with a conventional method.

After completion of the culture, the supernatant was removed from 20 mL of culture solution by centrifugation, and the obtained precipitate was suspended in water to prepare 20 mL of the yeast suspension. After 0.5 mL of ethanol was added to this yeast suspension, the pH was adjusted to 8 and shaken at 50° C. for 2 hours. Subsequently, the pH was adjusted to 5, 7.5 mg of Nuclease Amano G (trade mark, prepared by Amano Enzyme Inc.) was added, and the reaction was carried out at 65° C. for 1 hour. Further, 7.5 mg of DEAMIZYME (trademark, prepared by Amano Enzyme Inc.) was added and the mixture was reacted at 55° C. for 1 hour. Lastly, the enzyme was deactivated by being heated at 85° C. for 20 minutes, and the solid content was removed by centrifugation so as to obtain nucleic acid fermented seasoning liquid (Samples 13 to 16).

The nucleic acid fermented seasoning liquid was analyzed under the same conditions as those in Example 4, and the nucleic acid concentration was as indicated in Table 4. Table 4 indicates that yeasts other than *Candida utilis* can also be used for the production of nucleic acid fermented seasoning liquid.

Example 6

Comparison of HDMF Concentration

In order to compare the HDMF concentration contained in the product of the present invention with the commercially available high nucleic acid yeast extract, a nucleic acid fermented seasoning liquid was prepared.

13 g of potassium dihydrogen phosphate, 0.6 g of an antifoaming agent, and 380 mL of tap water were added to 520 g of the salt-free moromi of Example 1, and the mixture was adjusted to pH 5.5 with potassium hydroxide, and pasteurized at 115° C. in an autoclave for 15 minutes. This medium was inoculated with *Candida utilis* and cultured at 30° C. for 22 hours in accordance with a conventional method. 50% glucose aqueous solution which was separately pasteurized for removal of bacteria was fed at 8.4 g/hr, and aseptic air was blown at 1 L/min and internal pressure of 0.04 MPa. The stirring speed was 600 rpm.

After the culture, 1 mL of ethanol was added to 30 mL of cultured suspension, and then the pH was adjusted to 6.5 and shaken at 50° C. for 2 hours. Subsequently, the pH was adjusted to 5, 15 mg of Nuclease Amano G (trade mark, prepared by Amano Enzyme Inc.) was added, and the reaction was carried out at 70° C. for 1 hour. After the reaction, pH was adjusted to 6.5, 15 mg of DEAMIZYME (trademark, prepared by Amano Enzyme Inc.) was added and the mixture was reacted at 55° C. for 1 hour. Lastly, the enzyme was deactivated by being heated at 85° C. for 20 minutes, and the solid content was removed by centrifugation so as to obtain nucleic acid fermented seasoning liquid (Sample 17).

0.25 g of AROMILD (trademark, prepared by KOHJIN Life Sciences Co., Ltd.) was added to 50 mL of purified water, which was diluted 50-fold with 0.1% formic acid-containing water, and used for analyzing tasty nucleic acids. For quantification of the HDMF, one obtained 50 mg of AROMILD added to 50 mL of purified water was used. The quantification of the HDMF and quantification conditions of the tasty nucleic acids are as described in Example 1.

The results are indicated in Table 5. As indicated in Table 5, the tasty nucleic acids of commercially available koikuchi (dark-colored) soy sauce were below the detection limit, but the fermented seasoning liquid (Sample 17) of the present invention contained a remarkable amount of tasty nucleic acids. In addition, the fermented seasoning liquid (Sample 17) of the present invention contained the HDMF equivalent to commercially available koikuchi (dark-colored) soy sauce, but the HDMF was not detected from commercially available high nucleic acid yeast extract.

Therefore, it was found that the present fermented seasoning liquid can be provided as a seasoning liquid which contains a high content of nucleic acids without addition of nucleic acid and is excellent in a fragrant state like soy sauce.

TABLE 4

| Measurement Items | Concentration (ppm) | | | |
| --- | --- | --- | --- | --- |
| | Sample 13 (*Candida utilis*) | Sample 14 (*Saccharomyces cerevisiae*) | Sample 15 (*Zygosaccharomyces rouxii*) | Sample 16 (*Kluyveromyces marxianus*) |
| 5'-IMP | 93 | 99 | 65 | 48 |
| 5'-GMP | 73 | 80 | 40 | 27 |

TABLE 5

| Measurement Items | Concentration (ppm) | | |
|---|---|---|---|
| | Sample 17 | Commercially available high nucleic acid enzyme extract *[3] | Commercially available koikuchi (dark-colored) soy sauce *[1] |
| 5'-IMP | 300 | 533 | Detection limit or lower *[2] |
| 5'-GMP | 125 | 553 | Detection limit or lower *[2] |
| HDMF | 2 | Detection limit or lower *[2] | 2 |

*[1] "Kikkoman soy sauce" produced by Kikkoman Corporation
*[2] Detection limit: 1 ppm
*[3] AROMILD (trademark, prepared by KOHJIN Life Sciences Co., Ltd.)

The invention claimed is:

1. A fermented seasoning made by a fermentation process and obtained using moromi with a salt concentration of 4% (w/v) or less comprising:
   10 ppm (w/v) or more of nucleic acid(s) resulting from the fermentation process, and
   2 ppm (w/v) or more of 4-hydroxy-2,5-dimethyl-3(2H)-furanone (HDMF).

2. The fermented seasoning according to claim 1, wherein the nucleic acid(s) is tasty nucleotides.

3. The fermented seasoning according to claim 1, wherein the nucleic acid(s) is at least one selected from the group consisting of 5'-adenylic acid, 5'-guanylic acid, 5'-inosinic acid, and 5'-xanthylic acid.

4. The fermented seasoning according to claim 1, wherein a koji is used as a raw material.

5. The fermented seasoning according to claim 1, wherein the fermented seasoning comprises 50 ppm (w/v) or more of nucleic acid(s) resulting from the fermentation process.

* * * * *